United States Patent
Garman et al.

(10) Patent No.: US 8,109,668 B2
(45) Date of Patent: Feb. 7, 2012

(54) BLENDER HAVING AN INVERTABLE JAR FOR COMPACT STORAGE

(75) Inventors: Michael Garman, Midlothian, VA (US); Benjamin Henry Branson, III, Mechanicsville, VA (US)

(73) Assignee: Hamilton Beach Brands, Inc., Glen Allen, VA (US)

( * ) Notice: Subject to any disclaimer, the term of this patent is extended or adjusted under 35 U.S.C. 154(b) by 1106 days.

(21) Appl. No.: 11/681,006

(22) Filed: Mar. 1, 2007

(65) Prior Publication Data

US 2008/0212403 A1  Sep. 4, 2008

(51) Int. Cl.
*A47J 43/046* (2006.01)

(52) U.S. Cl. ........................................ 366/205

(58) Field of Classification Search ............. 241/199.12, 241/282.1–282.2; 366/197–207, 314
See application file for complete search history.

(56) References Cited

U.S. PATENT DOCUMENTS

| | | | | |
|---|---|---|---|---|
| 640,860 | A | * | 1/1900 | Baum ............................ 215/377 |
| 1,563,413 | A | * | 12/1925 | Whitcomb ....................... 99/508 |
| 2,789,798 | A | * | 4/1957 | Brace ............................ 366/199 |
| 2,800,310 | A | | 7/1957 | Snyder |
| 3,240,246 | A | * | 3/1966 | Dewenter ........................ 241/98 |
| 3,315,946 | A | | 4/1967 | Nissman |
| 3,458,175 | A | * | 7/1969 | Setsuo et al. ................ 241/282.2 |
| 3,537,691 | A | | 11/1970 | Tsuruta et al. |
| 3,550,657 | A | * | 12/1970 | Swanke ....................... 241/199.1 |
| 3,700,176 | A | * | 10/1972 | Haber ............................. 241/27 |
| D230,244 | S | * | 2/1974 | Kalbfeld ........................ D7/378 |
| 4,620,476 | A | * | 11/1986 | Brym ............................. 99/484 |
| D343,987 | S | * | 2/1994 | Rotte ............................. D7/386 |
| D390,416 | S | | 2/1998 | Hippen et al. |
| D400,757 | S | | 11/1998 | Hippen et al. |
| D448,967 | S | | 10/2001 | Planca et al. |
| D453,443 | S | | 2/2002 | Hoare et al. |
| D490,875 | S | | 6/2004 | Kim |
| D502,358 | S | | 3/2005 | Weaden |
| D510,238 | S | | 10/2005 | Yen |
| D512,265 | S | | 12/2005 | MCurrach |
| D519,314 | S | | 4/2006 | Blaise |
| D525,482 | S | | 7/2006 | Kassenaar |
| D528,855 | S | | 9/2006 | Picozza et al. |
| D554,938 | S | * | 11/2007 | Garman et al. ................ D7/378 |
| 7,350,963 | B2 | * | 4/2008 | Williams et al. .............. 366/205 |
| 7,617,766 | B2 | * | 11/2009 | Tracy et al. ..................... 99/413 |
| 7,712,951 | B2 | * | 5/2010 | Bohannon et al. ............ 366/205 |
| 2004/0032791 | A1 | | 2/2004 | Gauss |
| 2005/0122837 | A1 | * | 6/2005 | Bravard et al. ................ 366/199 |
| 2005/0152215 | A1 | * | 7/2005 | Stuart et al. ................... 366/205 |
| 2006/0028911 | A1 | * | 2/2006 | McGill .......................... 366/199 |
| 2006/0176768 | A1 | * | 8/2006 | Williams et al. .............. 366/205 |
| 2008/0170465 | A1 | * | 7/2008 | Bohannon et al. ............ 366/205 |
| 2008/0212403 | A1 | * | 9/2008 | Garman et al. ................ 366/205 |

* cited by examiner

*Primary Examiner* — Charles E Cooley
(74) *Attorney, Agent, or Firm* — Alexander D. Raring

(57) ABSTRACT

The blender includes a motor housing that has an outer surface surrounding an electric motor. The motor housing has a first end and a second end. The outer surface has a first mounting member. The motor housing includes a control electrically connected to the motor. A jar has an open end and a blending end and an interior surface. The jar includes a blade assembly proximate to the blending end. The jar is removably mountable to the first end of the motor housing in a operable position. The interior surface of the jar has a second mounting member. The second mounting member is in releasable registry with the first mounting member when the open end of the jar is placed over the first end of the motor housing in a storage position such that the motor housing is at least partially contained within the jar.

16 Claims, 5 Drawing Sheets

BLENDER HAVING AN INVERTABLE JAR FOR COMPACT STORAGE

BACKGROUND OF THE INVENTION

The present application is directed to a blender for compact storage, more particularly, to a blender that has an invertable jar placed over the motor housing for storage.

Blenders are a common household appliance and are capable of mixing liquids and chopping dry foods. Blenders are also useful for liquefying fruits and vegetables and for blending solids with liquids. A typical blender includes a jar that sits on top of a base or housing that encloses and controls a motor. The jar includes a blending tool rotatably mounted thereto. The blending tool is rotatably engageable with a drive shaft of the motor in an operating configuration. Foodstuff is placed into the jar and the jar is engaged with the base. The foodstuff is blended and the jar is removed from the base to dispense or pour the blended foodstuff.

The combination of the base and the jar is tall making it difficult to store the blender as a unit. As a result, the jar, its lid and the base are often separately stored resulting in possible loss of the jar or the lid. Additionally, dust and dirt may accumulate in the clutch opening of the exposed base and the electric cord may entangle with other stored items. Blenders have been introduced such that the jar may be inverted over the base. Though this configuration allows for more compact storage, the jar is freely rotatable about the base and the cord is not easily confined making the blender difficult to handle and transport. Additionally, blenders having an asymmetrical jar interior for improved blender performance do not securely fit over a symmetrical blending base.

It would be desirable therefore, to provide a compact storage blender with an asymmetrical interior that securely mates over the base in an inverted position and stores the electric cord and lid.

BRIEF SUMMARY OF THE INVENTION

Briefly stated, the present invention is directed to a blender. The blender includes a motor housing surrounding an electric motor. The motor housing has an outer surface, a first end and a second end. The outer surface has a first mounting member. The motor housing includes a control electrically connected to the motor. A jar has an open end, a blending end and an interior surface. The jar includes a blade assembly proximate to the blending end. The jar being removably mountable to the first end of the motor housing in a operable position. The interior surface has a second mounting member. The second mounting member is in releasable registry with the first mounting member when the open end of the jar is placed over the first end of the motor housing in a storage position such that the motor housing is at least partially contained within the jar.

In another aspect, the present invention is directed toward blender. The blender has a motor housing that surrounds an electric motor and has a first end and a second end. An electric cord is electrically connected to the electric motor and extends from the second end. A jar has an open end and a blending end. The jar has a blade assembly that is proximate to the blending end and extends into the jar. An interface rib extends from the blending end. The jar is removably mountable to the first end of the motor housing in a operable position. The open end of the jar is placed over the first end of the motor housing in a storage position such that the motor housing is at least partially contained within the jar. The electric cord extends along the outside of the jar and is wound at least partially around the interface rib in the storage position. A lid is removably mountable to the open end of the jar in the operable position and is removably mountable to the blending end of the jar in the storage position.

BRIEF DESCRIPTION OF THE SEVERAL VIEWS OF THE DRAWINGS

The foregoing summary, as well as the following detailed description of the invention, will be better understood when read in conjunction with the appended drawings. For the purpose of illustrating the invention, there are shown in the drawings an embodiment which is presently preferred. It should be understood, however, that the invention is not limited to the precise arrangements and instrumentalities shown.

In the drawings.

DETAILED DESCRIPTION OF THE INVENTION

Figure 1:
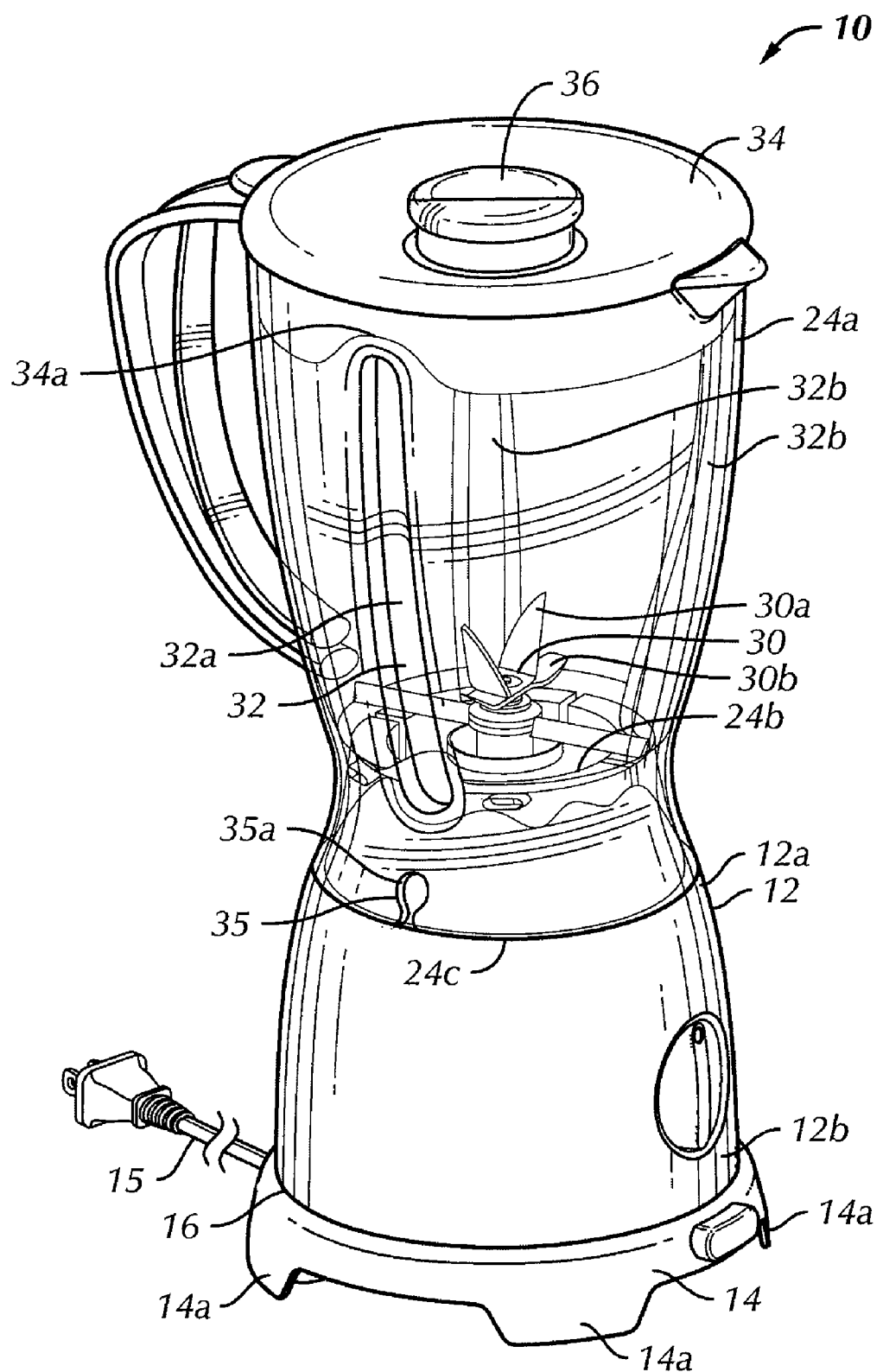
FIG. 1 is a front, right side perspective view of a blender in accordance with a preferred embodiment of the present invention in an upright or operable position.

Certain terminology is used in the following description for convenience only and is not limiting. The words "right," "left," "lower" and "upper" designate directions in the drawings to which reference is made. The words "inwardly" and "outwardly" refer to directions toward and away from, respectively, the geometric center of a blender having an invertable jar in accordance with the present invention, and designated parts thereof. The terminology includes the words noted above, derivatives thereof and words of similar import.

Unless specifically set forth herein, the terms "a", "an" and "the are not limited to one element but instead should be read as meaning "at least one".

Referring to the drawings, wherein like numerals indicate like elements throughout, there is shown in FIGS. 1-5 a blender having an invertible jar (blender), generally designated 10. The blender 10 is for being positioned on a support surface (not shown). The support surface is any type of flat surface which a user desires to position the blender 10 for blending foodstuff. Typical support surfaces include kitchen countertops, kitchen tables, bars, etc.

The blender 10 includes a jar 24 and motor housing 12 enclosing an electric motor (not shown). The jar 24 has a handle extending outwardly from an exterior surface thereof. The electric motor is a standard electric motor used in small appliances well understood by those of ordinary skill in the art. Accordingly, further description of the motor is omitted for purposes of convenience only and is not limiting.

The motor housing 12 includes a first or upper end 12a and a second or lower end 12b. The outer surface of the motor housing 12 tapers from the second end 12b toward the first end 12a. It is preferable that the motor housing 12 tapers inwardly from the second end 12b toward the first end 12a in a gradual manner as shown in FIGS. 1, 2, 4 and 5, however it is within the spirit and scope of the present invention that the motor housing 12 includes a more dramatic taper or that the motor housing 12 includes no taper at all. The motor housing 12 is generally cylindrical in shape but may include any shape known in the art such as square, triangular or oval or a distinct shape for mating with an inverted jar 24 as described in detail below.

The motor housing 12 includes a base 14. The base 14 is located on the second end 12b of the motor housing 12 and may be an extension of the base 14 or a separately attached component or bottom. An electric cord 15 for providing electrical power to the motor extends from the bottom of the base 14. The electric cord 15 is a standard electric cord used to power small appliances well understood by those of ordinary skill in the art. Accordingly, further description of the electric cord 15 is omitted for purposes of convenience only and is not limiting.

The base 14 has a larger outer diameter or at least a partially larger diameter than the diameter of the second end 12b of the motor housing 12. The base 14 includes a vent (not shown) for allowing ambient air to enter the housing 12 and cool the motor. The base 14 is spaced from the support surface by a plurality of legs 14a, spaced around the periphery of the base 14 and projecting downwardly in order to allow air to enter and exit from the bottom of the base 14. Elastomeric feet (not shown) may be placed on the legs 14a to prevent slippage with respect to the support surface. A ridge or lip 16 formed by the different in size between the base 14 and the motor housing 12 extends radially around the second end 12b of the motor housing 12 where the motor housing 12 joins the base 14.

Referring to FIG. 1, the motor housing 12 includes a control 18. The control 18 is preferably a rotary knob that is rotated to activate the motor and control the blender 10. The control 18 is preferably diametrically opposed to the electric cord 15. Though a rotary knob is the preferred control 18, any type of activation switch or any number of activation switches, such as a rocker switch, membrane switch, push button or any other switch known in the art may be used.

Figure 4:
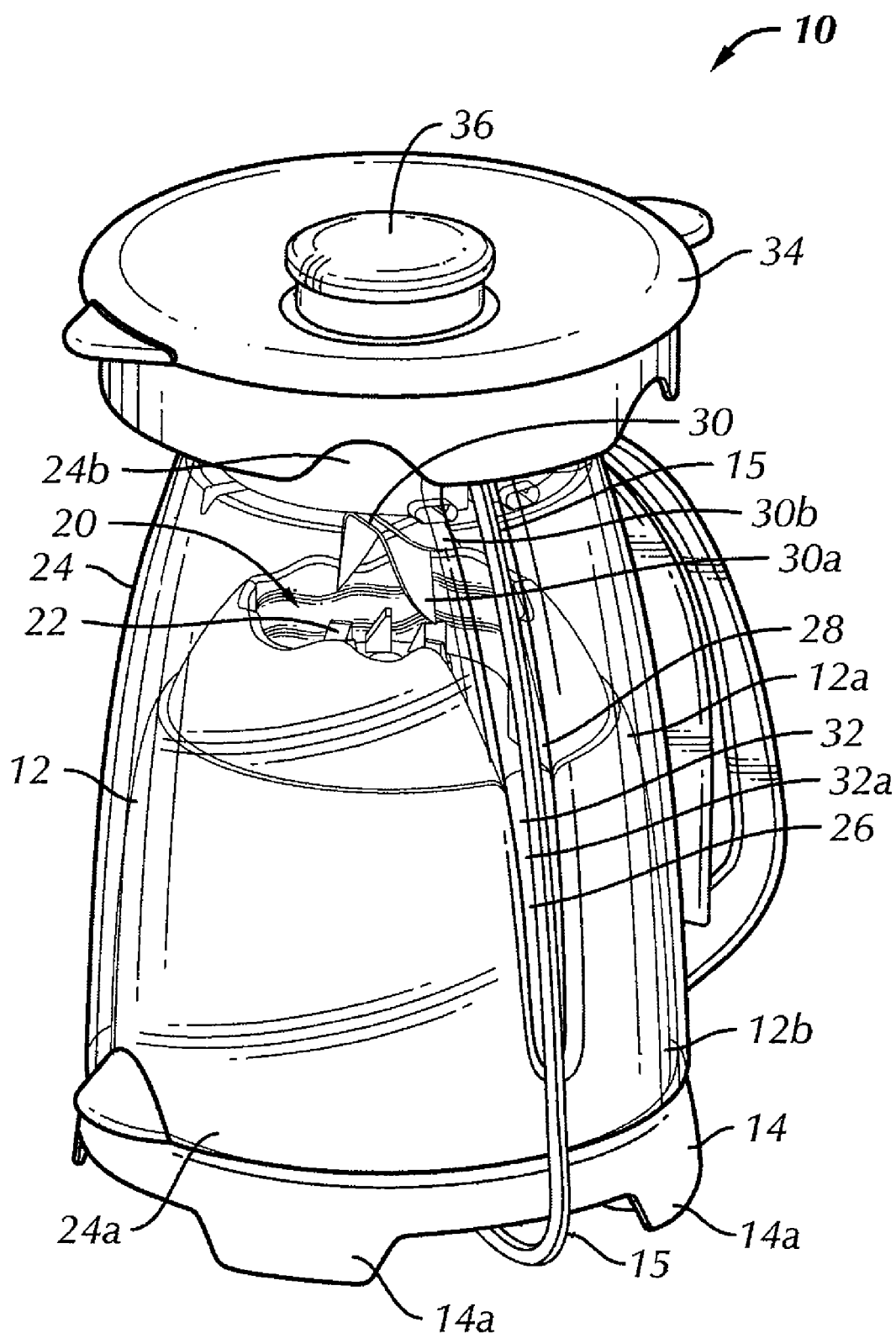
FIG. 4 is a rear perspective view of the blender shown in FIG. 1 in an inverted or storage position.
Figure 5:
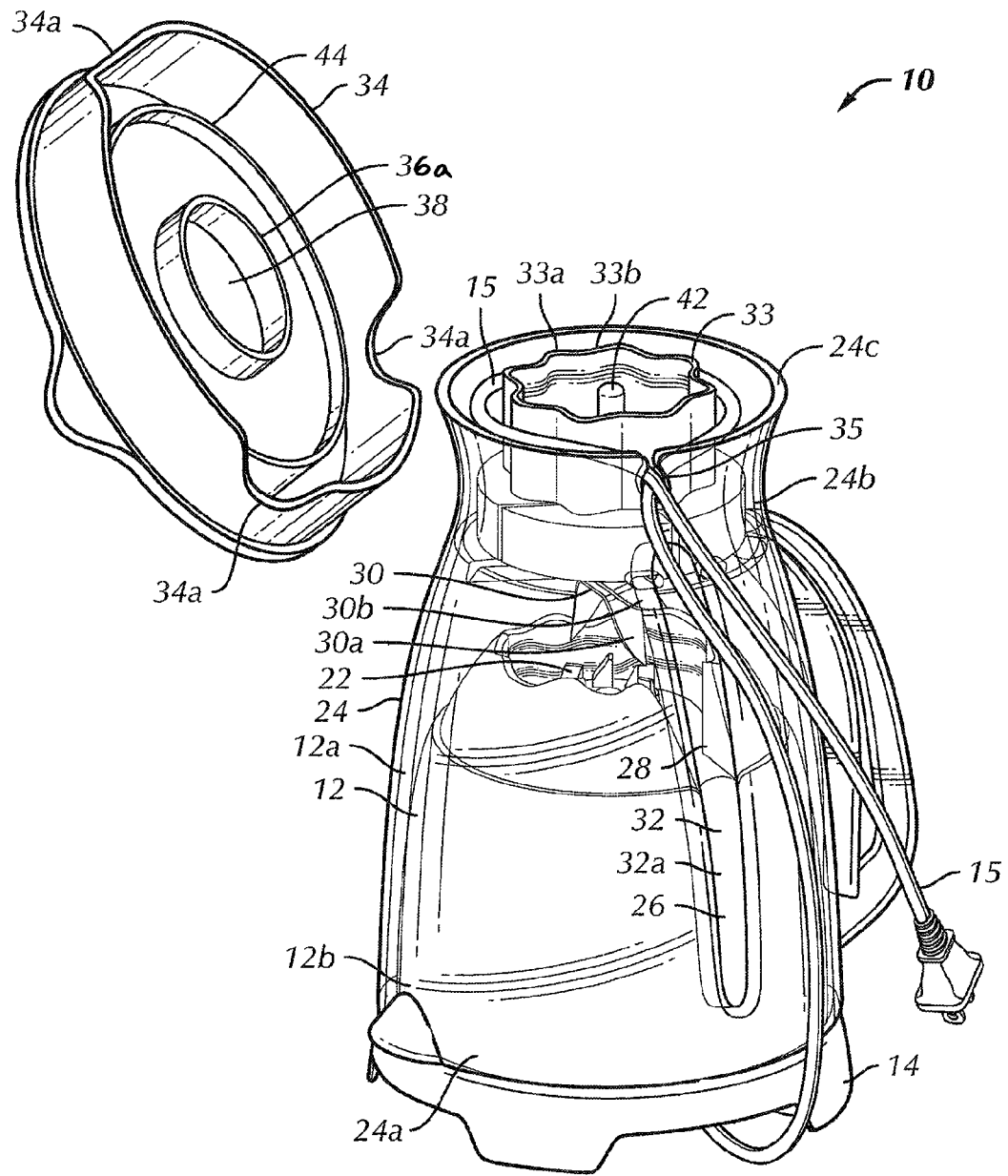
FIG. 5 is a rear perspective view of the blender shown in FIG. 4 with the lid removed to show how an electric cord is stored on the blending end of the jar in the storage position.

Referring to FIGS. 4 and 5, the first end 12a of the motor housing 12 includes a clutch opening 20. The clutch opening 20 exposes a clutch 22 driven by the motor. The clutch opening 20 is preferably a generally cylindrical opening having a wavy outer periphery such the diameter of the clutch opening 20 is variable. The clutch opening 20 is sized and shaped to receive an engage with a blending end 24b of the jar 24 as described in further detail below. The clutch 22 is preferably a toothed clutch as shown, however any type of clutch known in the art may be employed and the present invention is not limited to the clutch opening 20 and clutch 22 shown and described. It is within the spirit and scope of the present invention that a different clutch opening 20 and clutch 22 be employed.

Referring to FIGS. 1-5, the jar 24 is provided for receiving and blending foodstuff (not shown). The jar 24 includes an open or upper end 24a for receiving the foodstuff, the blending or lower end 24b for blending the foodstuff and attaching to the motor housing 12, a bottom rim 24c, and a sidewall extending from the open end 24a to the bottom rim 24b. The sidewall defines an interior surface and an opposing exterior surface of the jar 24. The interior surface of the jar 24 tapers inwardly from the open end 24a toward the blending end 24b. The jar 24 includes a blade assembly 30 proximate to the blending end 24b. The blade assembly 30 is preferably rotateable about a vertical axis and includes a first blade 30a and a second blade 30b such that the first blade 30a is generally U-shaped whereas the second blade 30b is generally planar. Though the blade assembly 30 as shown and described above is preferred, any blade assembly within the spirit and scope of the present invention and generally known in the art for use in a blender 10 may be used.

The blending end 24b of the jar 24 is removably mountable to the first end 12a of the motor housing 12 in an operable position as shown in FIG. 1. In the operable position shown in FIG. 1, the blade assembly 30 is driven by the clutch 22 and the motor and controlled by the rotary knob 18. The blade assembly 30 rotates to mix and chop foodstuff inserted into the jar 24.

Figure 2:
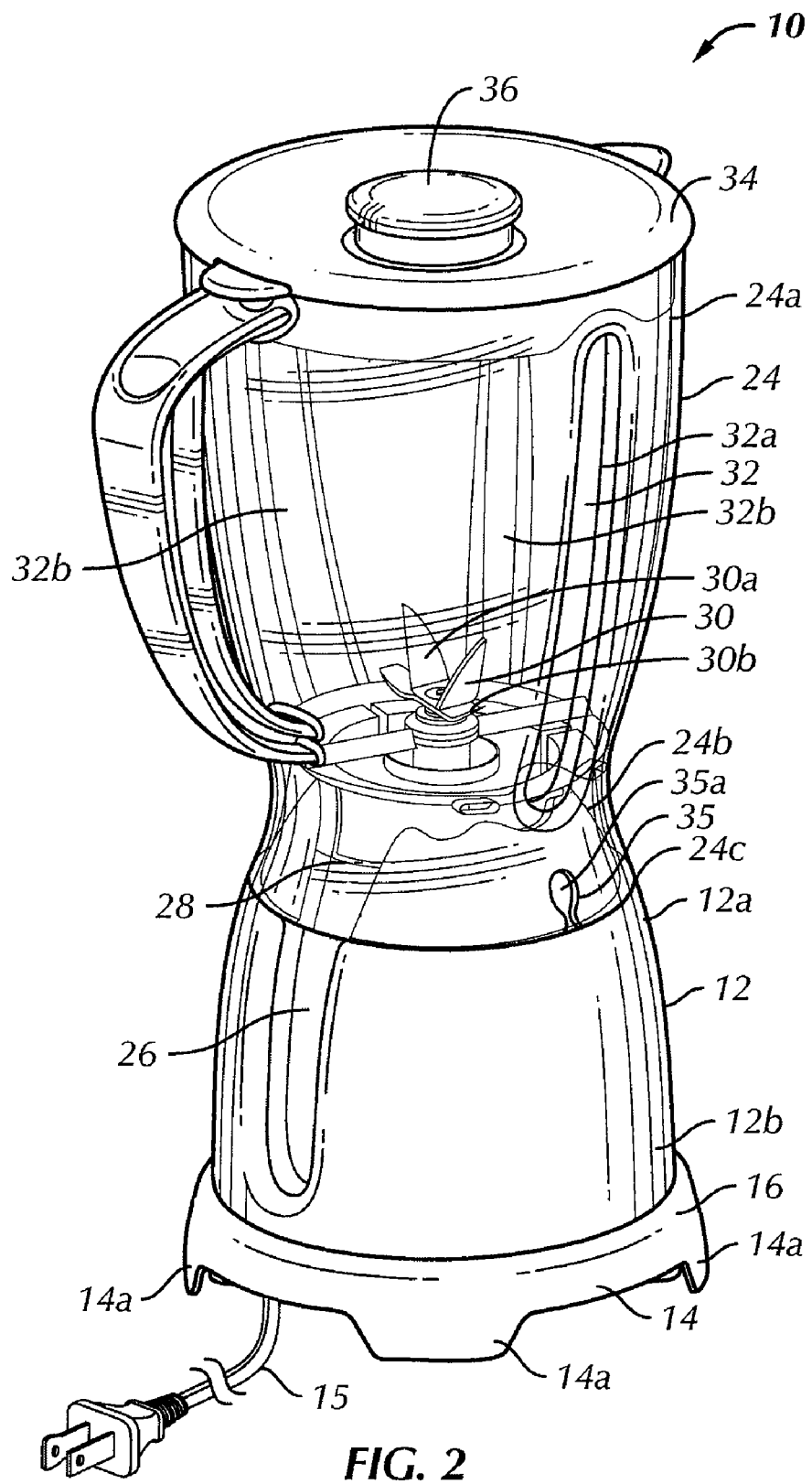
FIG. 2 is a rear, left side perspective view of the blender shown in FIG. 1.

As shown best in FIG. 2, the motor housing 12 includes a first mounting member 26, projecting radially inward from the outer surface and extending at least partially between the first and second ends 12a, 12b of the motor housing 12. The first mounting member 26 is preferably a generally rounded groove that extends vertically and partially between the first and second ends 12a, 12b of the motor housing 12 and tapers outwardly and narrows toward the second end 12b. However, the first mounting member 26 may include any shape such a square or triangle indentation, may extend the entire length of the motor housing 12 and may extend in a non vertical direction. In addition the first mounting member 26 may be curved or angled to form a receiving thread to allow a thread like attachment with the inverted jar 24. Though only one first mounting member 26 is shown in FIGS. 1-5, more than one first mounting member 26 may be positioned around the outer surface of the motor housing 12. The first mounting member 26 may also be an indent or a spring recessed latch such that the jar 24 prevents rotation or separation between the jar 24 and the motor housing 12 as discussed further below.

The clutch opening 20 further includes a spillway 28. The spillway is an opening in the side wall of the clutch opening 20 such that fluid within the clutch opening 20 is drained through the spillway 28. The spillway 28 is fluidly connected the first mounting member 26 such that fluid in the clutch opening 20 is directed along the spillway 28 and down the first mounting member or groove 26. Preferably, the spillway 28 is diametrically opposed to the control 18. Any additional mounting members (not shown) may also be in fluid communication with the clutch opening 20.

Figure 3:
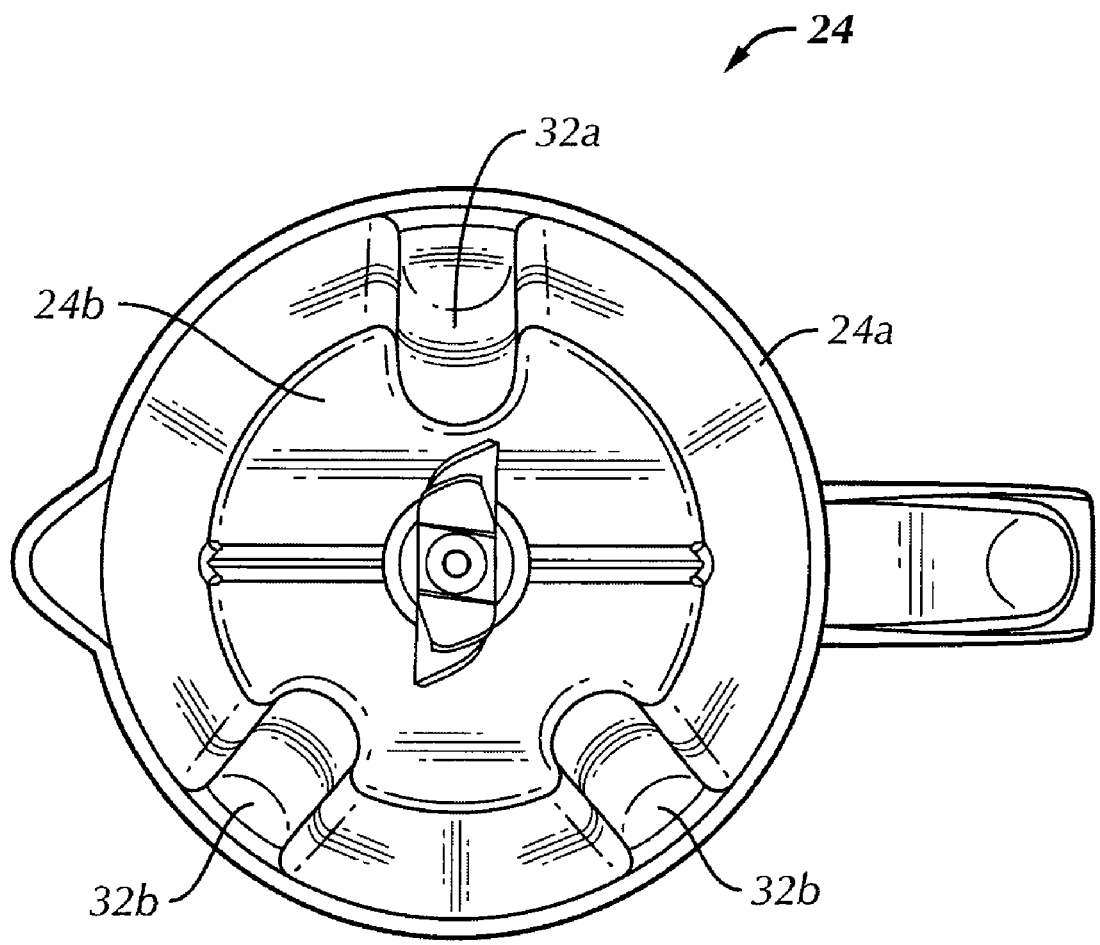
FIG. 3 is a top plan view of a jar of the blender shown in FIG. 1 with a lid removed.

The interior surface of the jar 24 includes a second mounting member 32. The second mounting member 32 is preferably a rib that projects radially inward and extends generally longitudinally at least partially along the jar 24 between the first and second ends 24a, 24b but may include any shape that is capable of mating or engaging with the first mounting member 26. The second mounting member 32 preferably includes a plurality of ribs 32a, 32b generally equally spaced around the interior surface of the jar 24. It is also preferred that one of the ribs 32a generally extends further in the radial direction than the remaining ribs 32b. Referring to FIGS. 2-4, the larger rib 32a extends radially further into the jar 24 than the remaining ribs 32b such that contents within the jar 24 have a more turbulent rotational flow than if the ribs 32 were all of the same size or if no second ribs 32b were included at all.

Alternatively, the jar 24 may be shaped such that a portion of the jar extends radially inwardly further than the remainder of the jar. One of the ribs 32a, 32b and preferably the largest rib 32a, is in registry with at least one of the first mounting members 26, preferably the groove fluidly engaged with the clutch opening 20 such that when the open end 24a of the jar 24 is placed over the first end 12a of the motor housing 12 in a storage position (shown in FIG. 3) the motor housing 12 is at least partially contained within the jar 24. Preferably, the open end 24a of the jar 24 substantially covers the motor housing 12 and the open end 24a of the jar 24 rests on the lip 16 of the base 14.

Referring to FIGS. 1, 2 and 5, the jar 24 includes an interface rib 33. The interface rib 33 extends from the blending end 24b of the jar 24 in a direction generally opposite from the blade assembly 30. The interface rib 33 is spaced inwardly a predetermined distance from the bottom rim 24c of the jar 24 around an entire circumference of the blending end 24b. The interface rib 33 is sized and shaped to be in registry with the clutch opening 20 in the operable position (FIGS. 1 and 2) such that the jar 24 is prevented from rotating with respect to the motor housing 12. The interface rib 33 fits within the clutch opening 20 while the surrounding jar 24 fits partially over the first end 12a of the motor housing 12. The interface rib 33 also serves as a storage spool for the electric cord 15 as described further below. The jar 24 includes a notch 35 in a bottom rim 24c of the jar 24. The notch 35 is an opening in the bottom rim 24c that extends into a bulbous opening 35a. The notch 35 is preferably positioned proximate the largest rib 32a. The notch 35 extends completely through the sidewall of the jar 24 from the interior surface of the jar 24 to the opposing exterior surface of the jar 24.

Referring to FIGS. 1, 4 and 5, the jar 24 includes a lid 34 removably mountable to the open end 24a of the jar 24. The lid 34 preferably includes indents 34a such that the ribs 32 in the jar 24 do not interfere with the lid 34 when positioned on the open end 24a of the jar 24. The lid 34 preferably includes a cap 36 which covers a circular opening 38 for inserting additional foodstuff when the blender 10 is in operation. Referring specifically to FIG. 5, the cap 36 includes a cylindrical rim 36a extending through the opening 38. The rim 36a is sized to form a compression or snap fit within the interface rib 33 in the storage position. A plurality of posts 42 may be provided within the interface rib 33 proximate to an outer wave 33a where the diameter of the interface rib 33 is the largest such that the rim 36a is further held in position against an inner wave 33b where the diameter of the interface rib 33 is the smallest. It is preferable that the lid 34 is receivable on the blending end 24b of the jar such that a deliberate force or action is required to remove the lid 34 from the jar 24. The posts 42 may be eliminated such that the rim is otherwise compression or snap fit within the interface rib 33.

The lid 34 is removably mountable to the open end 24a of the jar 24 in the operable position shown in FIG. 1 and removably mountable to the blending end 24b of the jar 24 in the storage position as shown in FIG. 4. Alternatively, the jar 24 may be sized and shaped to entirely fit over the motor housing 12 and base 14 such that the lid 34 remains engageable with the open end 24a of the jar 24 such that the jar 24 entirely encloses the motor housing 12 and base 14.

In operation, the jar 24 is positioned upright on the second end 12b of the base 12 such that the blending end 24b is inserted within the clutch opening 20. Foodstuff is then inserted into the jar open end 24a of the jar 24, the lid 34 is placed on the open end 24a of the jar 24 and the control 18 is activated to mix or blend the foodstuff within the jar 24 as shown in FIG. 1. In storage or nonuse the jar 24 is inverted over the motor housing 12 and aligned such that the largest rib 32a is engaged within groove 26. The rib 32a and the groove 26 prevent the jar 24 from rotating with respect to the motor housing 12 in the storage position as shown in FIG. 4. The electric cord 15 is then extended up the outside of the jar 24 along the rib 32a, fit within the notch 35 and wrapped at least partially around the interface rib 33. The cord 15 may be wrapped entirely around the interface rib 33 such that the remainder of the cord 15 is contained within the blending end 24b of the jar 24. The cord 15 is preferably brought back through the notch 35 such that the remainder of the cord 15 hangs down the outside of the jar 24 as shown in FIG. 5. The lid 34 is then mounted to the blending end 24b of the jar 24 as shown in FIG. 4 to cover the blending end 24b of the jar and a portion of the cord 15. A flange 44 on the inner surface of the lid 34 surrounds the bottom rim 24c on the blending end 24b of the jar 24 to further cover the blending end 24b of the jar in the inverted position and retain the cord 15 within the notch 35. Alternatively, the lid 34 may be placed underneath the base 14.

It will be appreciated by those skilled in the art that changes could be made to the embodiments described above without departing from the broad inventive concept thereof. It is understood, therefore, that this invention is not limited to the particular embodiment disclosed, but it is intended to cover modifications within the spirit and scope of the present invention as defined by the appended claims.

We claim:

1. A blender for blending foodstuff, the blender comprising:
    a motor housing surrounding an electric motor, the motor housing having an outer surface, a first end and a second end, the outer surface having a first mounting member, the motor housing including a control electrically connected to the motor; and
    a jar having an open end, a blending end, a bottom rim and a sidewall extending from the open end to the bottom rim, the sidewall defining an interior surface and an opposing exterior surface, the jar including a blade assembly proximate to the blending end, the jar being removably mountable to the first end of the motor housing in a operable position, the interior surface having a second mounting member, the second mounting member being in releasable registry with the first mounting member when the open end of the jar is placed over the first end of the motor housing in a storage position such that the motor housing is at least partially contained within the jar, the jar further including a notch in the blending end, the notch extending completely through the sidewall of the jar from the interior surface of the jar to the opposing exterior surface of the jar.

2. The blender of claim 1, wherein the outer surface of the motor housing tapers inwardly from the second end toward the first end and the interior surface of the jar tapers from the open end toward the blending end.

3. The blender of claim 1, further comprising:
    a lid removably mountable to the open end of the jar in the operable position and removably mountable to the blending end of the jar in the storage position; and
    an interface rib extending from the blending end of the jar in a direction generally opposite from the blade assembly, the interface rib spaced-apart inwardly a predetermined distance from a bottom rim of the jar around an entire circumference of the blending end, the interface rib extending along a longitudinal axis of the jar generally equal to the bottom rim of the jar, an exterior surface of the jar having a handle extending outwardly therefrom, the lid including a cylindrical rim extending from a bottom surface thereof sized to form a compression or snap fit within the interface rib in the storage position.

4. The blender of claim 1, wherein the second mounting member includes at least one rib projecting radially inwardly and extending generally longitudinally at least partially along the jar.

5. The blender of claim 4, wherein the at least one rib includes a plurality of ribs generally equally spaced around the interior surface of the jar.

6. The blender of claim 5, wherein one of the plurality of ribs generally extends further in the radial inward direction than the remaining ribs.

7. The blender of claim 4, wherein the first mounting member includes at least one groove projecting radially inwardly and extending at least partially between the first and second ends of the motor housing for receiving the at least one rib.

8. The blender of claim 7, the first end of the motor housing further including a clutch opening for engagement with the blade assembly of the jar and a spillway, the spillway being fluidly connected to the first mounting member such that fluid in the clutch opening is directed along the spillway and the first member.

9. The blender of claim 8, wherein the spillway is diametrically opposed to the control.

10. The blender of claim 8, wherein the jar includes an interface rib, the interface rib extending from the blending end in a direction generally opposite from the blade assembly, the interface rib being in registry with the clutch opening in the operable position such that the jar is prevented from rotating with respect to the motor housing.

11. The blender of claim 10, wherein the motor housing includes an electric cord electrically connected to the electric motor and extending from the second end, the electric cord extending along the outside of the jar and wound at least partially around the interface rib in the storage position.

12. The blender of claim 11, wherein a lid is removably mountable to the interface rib to cover the blending end of the jar and a portion of the electric cord in the storage position.

13. The blender of claim 12, wherein the electric cord extends up along the jar then through the notch toward the interface rib.

14. A blender for blending foodstuff, the blender comprising:
  a motor housing surrounding an electric motor and having a first end, a second end and an electric cord electrically connected to the electric motor and extending from the second end,
  a jar having an open end, a blending end, and a bottom rim proximate to the blending end, an exterior surface of the jar having a handle extending outwardly therefrom, the jar having a blade assembly proximate to the blending end and extending into the jar, and an interface rib extending from the blending end and spaced-apart inwardly a predetermined distance from the bottom rim of the jar around an entire circumference of the blending end, the interface rib extending along a longitudinal axis of the jar generally equal to the bottom rim of the jar, the jar being removably mountable to the first end of the motor housing in a operable position, the open end of the jar being placed over the first end of the motor housing in a storage position such that the motor housing is at least partially contained within the jar, the electric cord extending along the outside of the jar and wound at least partially around the interface rib in the storage position; and
  a lid removably mountable to the open end of the jar in the operable position and removably mountable to the blending end of the jar in the storage position.

15. The blender of claim 14, wherein the bottom rim includes a notch that extends completely through a sidewall of the jar, the sidewall extends from the open end of the jar to the bottom rim, the notch extends from an interior surface of the sidewall to the opposing exterior surface thereof, the cord disposed through the notch in the storage position.

16. The blender of claim 14, wherein the lid includes a cylindrical rim extending from a bottom surface thereof sized to form a compression or snap fit within the interface rib in the storage position.

* * * * *